(12) United States Patent
Yu

(10) Patent No.: US 9,942,088 B2
(45) Date of Patent: Apr. 10, 2018

(54) FAULT DETECTION METHOD, GATEWAY, USER EQUIPMENT, AND COMMUNICATIONS SYSTEM

(71) Applicant: Huawei Technologies Co., Ltd., Shenzhen (CN)

(72) Inventor: Yijun Yu, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 99 days.

(21) Appl. No.: 15/195,676

(22) Filed: Jun. 28, 2016

(65) Prior Publication Data

US 2016/0308711 A1 Oct. 20, 2016

Related U.S. Application Data

(63) Continuation of application No. 14/292,323, filed on May 30, 2014, now Pat. No. 9,405,638, which is a continuation of application No. PCT/CN2011/083348, filed on Dec. 2, 2011.

(51) Int. Cl.
| | |
|---|---|
| *G06F 11/00* | (2006.01) |
| *H04L 12/24* | (2006.01) |
| *G06F 11/30* | (2006.01) |
| *G06F 11/20* | (2006.01) |
| *G06F 11/07* | (2006.01) |

(Continued)

(52) U.S. Cl.
CPC ........ *H04L 41/0672* (2013.01); *G06F 11/079* (2013.01); *G06F 11/0709* (2013.01); *G06F 11/20* (2013.01); *G06F 11/2025* (2013.01); *G06F 11/30* (2013.01); *G06F 11/3051* (2013.01); *H04L 43/0817* (2013.01); *H04L 61/1511* (2013.01); *H04L 69/40* (2013.01); *H04W 24/04* (2013.01); *H04W 88/02* (2013.01); *H04W 88/16* (2013.01)

(58) Field of Classification Search
CPC .... G06F 11/079; G06F 11/0709; G06F 11/20; G06F 11/2025; G06F 11/30; G06F 11/3051
See application file for complete search history.

(56) References Cited

U.S. PATENT DOCUMENTS

| | | | | |
|---|---|---|---|---|
| 7,680,876 B1 * | 3/2010 | Cioli | .................. | G06F 11/1662 709/201 |
| 2001/0039585 A1 * | 11/2001 | Primak | ............. | H04L 29/12066 709/228 |

(Continued)

FOREIGN PATENT DOCUMENTS

| | | |
|---|---|---|
| CN | 1589545 A | 3/2005 |
| CN | 101442452 A | 5/2009 |

(Continued)

*Primary Examiner* — Charles Ehne
(74) *Attorney, Agent, or Firm* — Slater Matsil, LLP

(57) ABSTRACT

Embodiments of the present invention provide a fault detection method. The method includes discovering that a fault occurs in a DNS server or a service server related to a UE, and performing, by a gateway, fault detection on the DNS server or the service server. The method also includes, after the fault is rectified, instructing the UE to establish a connection to the DNS server or the service server. Correspondingly, the embodiments of the present invention further provide a gateway, a UE, and a communications system.

19 Claims, 9 Drawing Sheets

(51) Int. Cl.
*H04L 12/26* (2006.01)
*H04L 29/12* (2006.01)
*H04W 24/04* (2009.01)
*H04L 29/14* (2006.01)
*H04W 88/02* (2009.01)
*H04W 88/16* (2009.01)

(56) References Cited

U.S. PATENT DOCUMENTS

| | | |
|---|---|---|
| 2002/0010798 A1 | 1/2002 | Ben-Shaul et al. |
| 2003/0055954 A1 | 3/2003 | Kavanagh |
| 2004/0236999 A1 | 11/2004 | Bezuidenhout |
| 2009/0161554 A1* | 6/2009 | Agarwal ............ H04L 41/0631 370/241 |
| 2010/0332680 A1 | 12/2010 | Anderson et al. |
| 2011/0055622 A1 | 3/2011 | Arai et al. |
| 2011/0149720 A1 | 6/2011 | Phuah et al. |
| 2011/0173318 A1 | 7/2011 | Ma |
| 2011/0185237 A1 | 7/2011 | Mandi et al. |
| 2011/0202793 A1 | 8/2011 | Xu |
| 2011/0252120 A1 | 10/2011 | Flinta et al. |
| 2014/0143414 A1 | 5/2014 | Deng et al. |

FOREIGN PATENT DOCUMENTS

| | | |
|---|---|---|
| CN | 101662387 A | 3/2010 |
| CN | 102064979 A | 5/2011 |
| CN | 102130791 A | 7/2011 |

* cited by examiner

FAULT DETECTION METHOD, GATEWAY, USER EQUIPMENT, AND COMMUNICATIONS SYSTEM

CROSS-REFERENCE TO RELATED APPLICATIONS

This application is a continuation of U.S. patent application Ser. No. 14/292,323, filed on May 30, 2014, which is a continuation of International Application No. PCT/CN2011/083348, filed on Dec. 2, 2011, The afore-mentioned patent applications are hereby incorporated by reference in their entireties.

TECHNICAL FIELD

Embodiments of the present invention relate to the field of communications technologies, and in particular, to a fault detection method, a gateway, a user equipment, and a communications system.

BACKGROUND

With popularization of intelligent terminals, a variety of mobile data services emerge, which support a user equipment (UE) in accessing the Internet through mobile networks of different standards, for example, QQ, Facebook, Sina Weibo, webpage browsing, and email processing.

Because mobile data network traffic increases dramatically, a mobile network originally adapted to a conventional terminal cannot bear the heavy load, leading to obvious reduction in network quality. Moreover, conventional Internet service servers, such as IT devices including a QQ server, a Facebook server, a google server set for Android, and a DNS server also cannot bear the heavy load, and because robustness of this kind of IT device is much lower than that of a telecommunications network device, faults, such as system congestion and breakdown, may often occur. When a fault occurs in these devices, a user equipment (such as an intelligent terminal) accessing through a mobile network may make continual attempts to detect as soon as possible when a service recovers, for example, continually perform DNS query attempts and TCP connection attempts. A time interval between the attempt behavior is generally up to tens of seconds or even longer, which is far longer than detection duration (generally 6 to 8 seconds) for inactivity of an air interface of the mobile network. According to an operating mechanism of the mobile network, when a network discovers that no data is transmitted in continuous time of the detection duration for the inactivity of the air interface of the mobile network, the network may be triggered to release an air interface connection, and the user equipment is switched from a connected state (such as an ECM_CONNECTED state) to an idle state (such as an ECM_IDLE state). Therefore, the TCP/DNS re-attempt behavior may lead to continual establishment and release of the air interface connection between the UE and the mobile network. However, each time the connection is established, it is required that the UE and the mobile network perform a related connection establishment process, which thereby produces frequent and a large amount of connection establishment signaling (such as a Service Request) and connection release signaling that is caused by the inactivity of the air interface for quite a long time. Therefore, once the Internet service server fails, before the fault is rectified, the behavior of the user equipment brings a severe signaling impact on the mobile network.

In addition, after the UE keeps failing to perform service attempts for a period of time, the UE usually initiates deactivation processing on a bearer, and immediately activates the bearer again, so as to detect whether the service is unavailable because of a mobile network problem. A time interval between the deactivation/activation process is relatively large. However, because the number of user equipments using a same Internet service is usually large, when an Internet service server is faulty or a public server (such as a DNS server) is faulty, it may lead to that a large number of affected user equipments simultaneously perform bearer deactivation/activation processing in a short time, and may also bring a severe signal impact on the mobile network.

Therefore, a network air interface connection control method is introduced in the prior art. The method introduces a state called "CELL_PCH". This state may be regarded as a sub state of a connected state, which saves power compared with a normal connected state, and saves air interface resources. However, different from an idle state, an air interface connection can be maintained in the sub state. After the control mechanism is introduced, when a wireless network detects that no data is transmitted by a UE (for example, for 6 to 8 seconds), a state of the UE is switched to the CELL_PCH state, instead of the idle state. In this case, the air interface connection and a network-side connection are not released. When the UE in the CELL_PCH state does not transmit any data within a period of time, the UE is switched to the idle state, and the air interface connection is released. If the UE transmits data within the period of time, the network again switches the UE to a primary state of the connected state, to complete the data transmission.

In the prior art, after the service server or the DNS server is faulty, the UE actively initiates fault detection, which inevitably leads to execution of frequent air interface connections and release, or frequent bearer deactivation and activation, thereby bringing a great signaling impact on the mobile network.

SUMMARY

Embodiments of the present invention provide a fault detection method, gateway, user equipment and communications system, so as to solve the problem of frequent air interface connections and release or frequent bearer deactivation and activation in the prior art, which arises because a UE actively initiates fault detection.

According to one aspect, an embodiment of the present invention provides a fault detection method, including detecting that a fault occurs in a domain name system DNS server or a service server related to a user equipment UE; performing, by a gateway, fault detection on the DNS server or the service server; and, after the fault is rectified, instructing the UE to establish a connection to the DNS server or the service server.

According to another aspect, an embodiment of the present invention provides a gateway, including a fault discovery unit, configured to discover that a fault occurs in a domain name system DNS server or a service server related to a user equipment UE. The gateway also includes a fault detection unit, configured to perform fault detection on the DNS server or the service server. The gateway also includes a notification unit, configured to: after it is detected that the fault is rectified, instruct the UE to establish a connection to the DNS server or the service server.

In addition, an embodiment of the present invention further provides a user equipment UE, including a fault discovery unit, configured to discover that a fault occurs in a domain name system DNS server or a service server. The UE also includes a receiving unit, configured to receive a notification that a gateway performs fault detection on the DNS server or the service server; and after the fault is rectified, receive a notification, sent by the gateway, of establishing a connection to the DNS server or the service server. The UE also includes a connection establishment unit, establishing the connection to the DNS server or the service server.

An embodiment of the present invention further provides a communications system, including a gateway and a user equipment UE, where the gateway is configured to discover that a fault occurs in a domain name system DNS server or a service server related to the UE, perform fault detection on the DNS server or the service server, and after it is detected that the fault is rectified, instruct the UE to establish a connection to the DNS server or the service server. The UE is configured to receive a notification that the gateway performs fault detection on the DNS server or the service server; and after the fault is rectified, receive a notification, sent by the gateway, of establishing a connection to the DNS server or the service server, and establish the connection to the DNS server or the service server.

According to the method, the gateway, the user equipment, and the communications system provided in the embodiments of the present invention, a gateway device performs path detection, which avoids frequent air interface release and connections, and frequent bearer deactivation and activation, thereby reducing the signaling overhead of the system, and enhancing stability of a mobile network.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Embodiment 1 of the Present Invention

Figure 1:
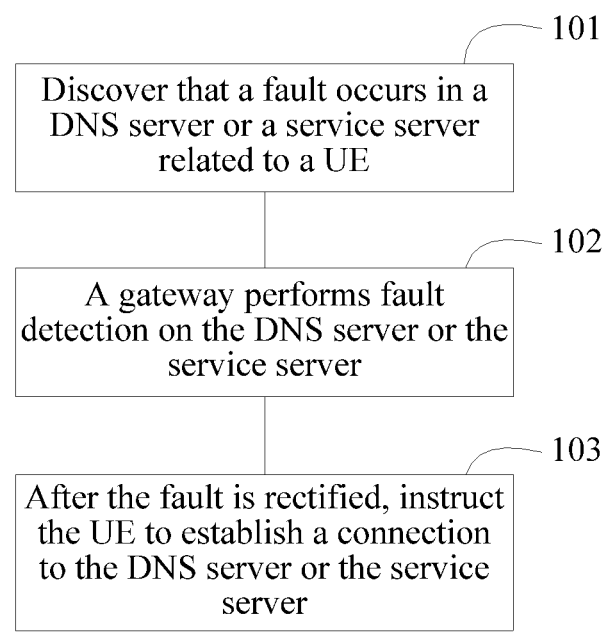
FIG. 1 is a flowchart of a method according to Embodiment 1 of the present invention.

This embodiment of the present invention provides a fault detection method. Referring to FIG. 1, the method includes the following steps.

Step 101: Discover that a fault occurs in a domain name system (DNS) server or a service server related to a UE.

Herein, it may be that the UE discovers that a fault occurs in the DNS server or the service server, or a gateway discovers that a fault occurs in the DNS server or the service server. It should be noted that in the embodiment, a fault in a DNS server or a service server related to a UE may be caused by a fault in the server, for example, a restart of the server; or may be caused by a fault that occurs in a server in charge of a routing function; or may be caused by a fault that occurs in a path connecting a mobile network and a server, for example, a fault that occurs in a path link or a fault that occurs in a router on a path.

The UE may notify, by using a bearer update process, the gateway of information about a server on which the gateway is required to perform fault detection as a proxy for the UE, where the address information of the server may include an IP address and/or a port number of the DNS server or the service server, or a domain name of the server. The bearer update process may be that the UE sends a modify PDP context request message to a serving GPRS support node (SGSN), and the SGSN sends an update PDP context request message to a gateway GPRS support node (GGSN); or may also be that the UE sends a request bearer resource modification message to a mobility management entity (MME), the MME sends a bearer resource command message to a serving gateway (S-GW), the S-GW sends the bearer resource command message or a proxy binding update message to a packet data network gateway (P-GW), or the S-GW sends a Policy and Charging Control (PCC) update request message to a policy and charging rules function (PCRF), and the PCRF sends the PCC update request message to the P-GW.

When detecting that a fault occurs in the DNS server or the service server, the gateway may instruct the UE to stop a DNS query or a TCP connection attempt.

Step 102: The gateway performs fault detection on the DNS server or the service server.

The gateway may perform, as a proxy for the UE, fault detection on the DNS server or the service server. Specifically, after obtaining that a fault occurs in the DNS server or the service server related to the UE, the gateway may send a DNS detection message to the DNS server, or send a path detection message to the service server, for example, send a connection establishment request message to detect whether a response can be received.

Step 103: After the fault is rectified, instruct the UE to establish a connection to the DNS server or the service server.

It should be noted that, the UE and the gateway may, in a data channel establishment process, or a default bearer establishment process, or a PDN connection establishment process, or a dedicated bearer establishment process, exchange a capability indication that the gateway performs fault detection as a proxy for the UE, where the capability indication may be provided by a gateway device and indicate that the gateway supports the capability of performing fault detection as a proxy for the UE, or may be provided by the UE and indicate that the UE supports the capability of the gateway to perform fault detection as a proxy for the UE.

According to the embodiment of the present invention, a gateway device performs fault detection, which avoids frequent air interface release and connections, and frequent bearer deactivation and activation, thereby reducing the signaling overhead of the system, and enhancing stability of a mobile network.

Embodiment 2 of the Present Invention

Figure 2A:
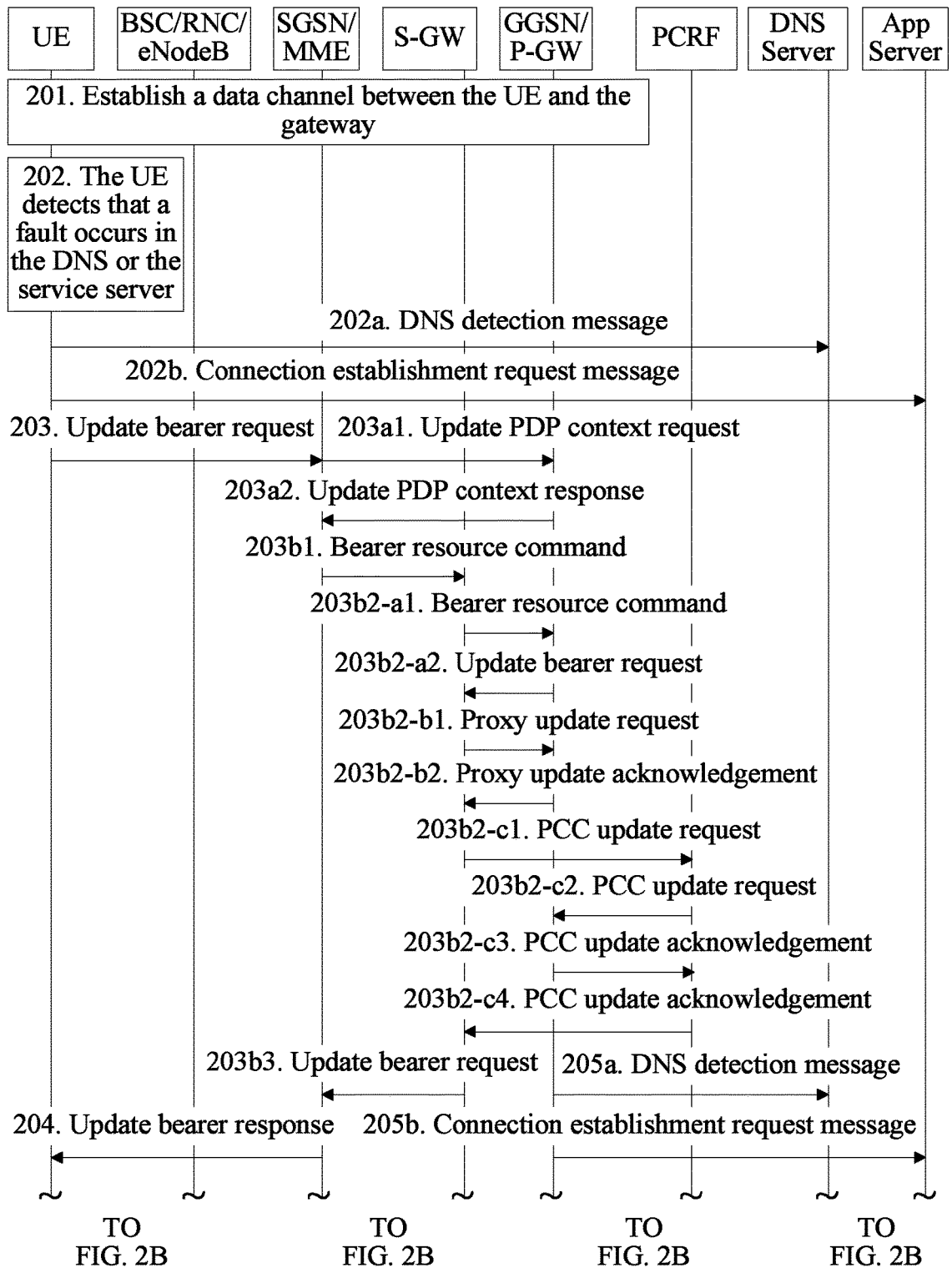
FIG. 2A and FIG. 2B are a flowchart of a method according to Embodiment 2 of the present invention.
Figure 2B:
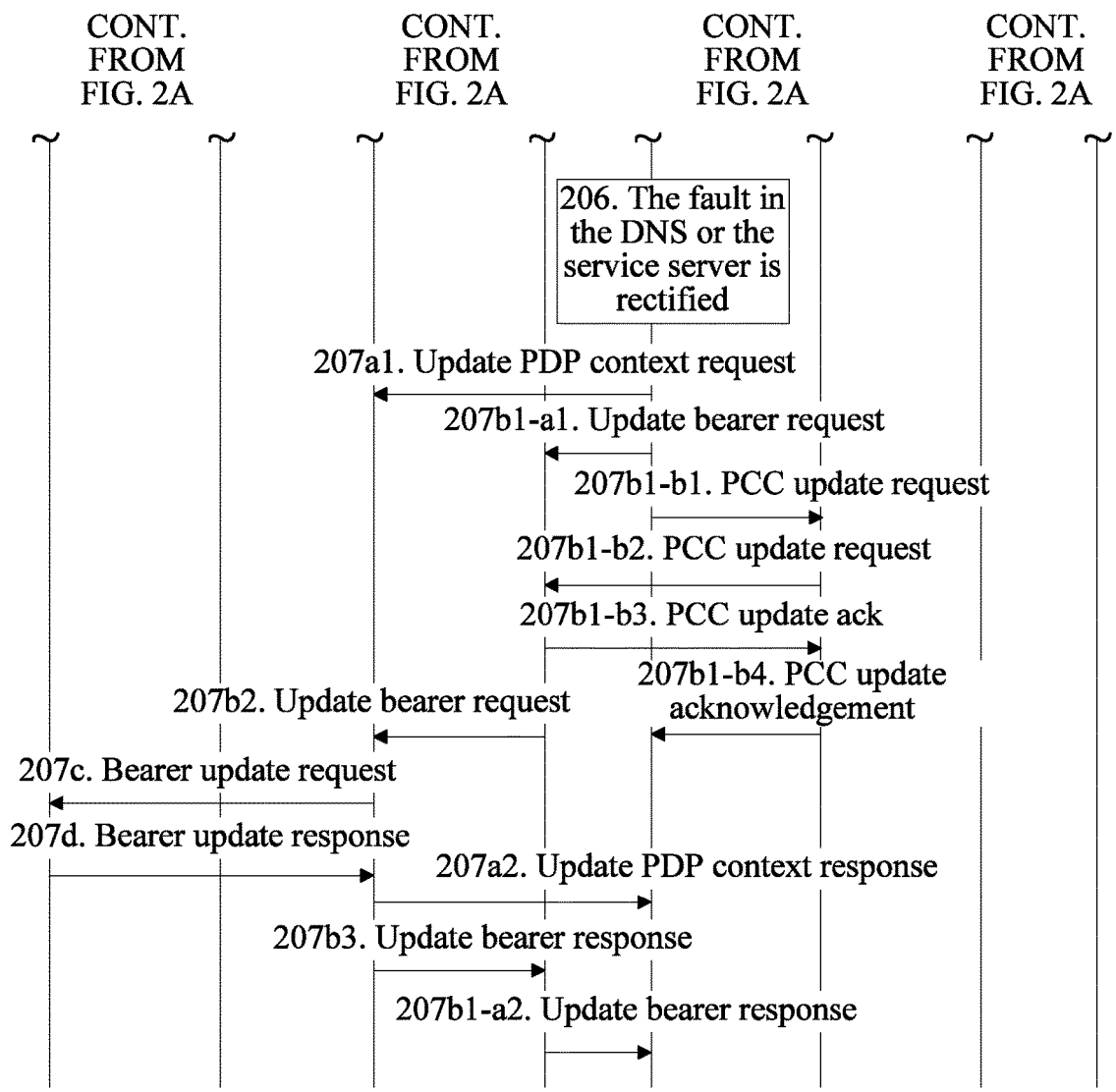

In this embodiment, a UE detects a fault in a server, so as to instruct a gateway device to perform path detection, referring to FIG. 2A and FIG. 2B.

Step 201: A data channel used for data transmission is established between a UE and a gateway GGSN/P-GW.

In a GPRS network, a PDP (Packet Data Protocol) channel between a UE and a GGSN may be established by using a PDP activation process; in an EPS network, a bearer in the UE and the EPS network may be established by using a bearer establishment process.

In the process, the UE and the gateway device GGSN/P-GW may exchange a capability for supporting a characteristic that "a gateway performs fault detection as a proxy for a UE". For details, reference may be made to Embodiment 4 to Embodiment 9.

Step 202: The UE detects that a fault occurs in a DNS server or a service server (such as a QQ server, a Facebook server, a Tencent Weibo server, a news website, and a mail server).

The fault may be caused by a fault in the server (for example, a restart of the server), or may be caused by a fault in a server in charge of a routing function, or may be caused by a fault that occurs in a path connecting a mobile network and a server, for example, a fault that occurs in a path link or a fault that occurs in a router on a path. An external manifestation is that the UE cannot obtain a DNS query response, or cannot obtain a TCP connection establishment response.

When detecting the fault, the UE may perform the following step 202a and step 202b first, and then when a response message cannot be obtained in step 202a or 202b, perform step 203; or may directly perform step 203 by skipping steps 202a and 202b.

Step 202a: The UE sends a DNS detection message to the DNS server by using the data channel established in step 201, for example, sends a DNS query request message.

Step 202b: The UE sends a connection establishment request message to a target server by using the data channel established in step 201, such as a TCP handshake message, or an HTTP connection establishment request message.

Step 202a or step 202b may be independently performed. A related destination DNS server or service server may also have a backup server. In this case, when a primary server does not respond, the UE may send a related detection request to the backup server. When the detection request fails, step 203 is performed.

Step 203: The UE sends an update bearer request message to an SGSN/MME and then to the GGSN/P-GW, to instruct the GGSN/PGW to perform fault detection as a proxy for the UE.

The update bearer request message may be performed by randomly selecting one bearer in the data channel, or selecting a specific bearer, for example, a default bearer.

Specifically, a "fault detection identifier" may be carried in the update bearer request message for indication.

In addition, the request message may further carry address information, for example, an IP address and/or a port number, of a destination server that needs to be detected, for example, a DNS server or a service server, or a domain name of the server. The address information of the destination server may be provided by using a separate information element, or may be implemented by expanding an existing information element, for example, by expanding a packet configuration option (PCO) information element. The address information of the destination server may also include address information of the primary server and the backup server of the server.

If the request message includes the address information of the destination server, the "fault detection identifier" may also not be displayed and provided, and the gateway may perform subsequent processing according to the received address information of the destination server.

In two cases of a GPRS network and an EPS network, a specific bearer update process is as follows:

In the GPRS network, the update bearer request message sent by the UE to the SGSN is specifically a Modify PDP Context Request message; in the EPS network, the update bearer request message sent by the UE to the MME is specifically a Request Bearer Resource Modification message.

After the SGSN/MME receives the request message, one of the following processing procedures is performed according to an interface situation of the network.

(1) In the GPRS network, if the SGSN is a Gn/Gp SGSN, the SGSN sends an Update PDP Context Request message to the GGSN, that is, step 203a1; in this case, the GGSN performs step 203a2 to send an Update PDP Context Response message to the SGSN.

(2) In the GPRS network, if the SGSN is an S4 SGSN, or in the EPS network, the SGSN/MME sends a Bearer Resource Command message to the S-GW, that is, step 203b1, and then performs one of the following processing procedures according to an interface protocol situation of the S-GW.

(2-1) When the GTP (GPRS tunneling protocol) protocol is used between the S-GW and the P-GW, the S-GW sends a Bearer Resource Command message to the P-GW, that is, step 203b2-a1; in this case, the P-GW performs step 203b2-a2 to send an Update Bearer Request message to the S-GW.

(2-2) When the PMIP (proxy mobile IP protocol) protocol is used between the S-GW and the P-GW, the S-GW sends a Proxy Binding Update message to the P-GW, that is, step 203b2-b1; in this case, the P-GW subsequently performs step 203b2-b2 to send a Proxy Binding Ack message to the S-GW.

(2-3) When the PMIP protocol is used between the S-GW and the P-GW, the S-GW may also complete interaction with the P-GW through a PCRF, that is, the S-GW performs step 203b2-c1 to send a PCC update request message to the PCRF, the PCRF performs step 203b2-c2 to send the PCC update request message to the P-GW, the P-GW performs step 203*b*2-*c*3 to send a PCC update acknowledgement message to the PCRF, and the PCRF performs step 203*b*2-*c*4 to send the PCC update acknowledgement message to the S-GW.

The steps 203*a*1, 203*b*1, 203*b*2-*a*1, 203*b*2-*b*1, 203*b*2-*c*1, and 203*b*2-*c*2 include information such as the address information of the DNS server or service server that needs to be detected and the "fault detection identifier".

After receiving the message in step 203*a*1, 203*b*2-*a*1, 203*b*2-*b*1, or 203*b*2-*c*2, the gateway device GGSN/P-GW sends a response message to the UE, that is, step 203*a*2, 203*b*2-*a*2, 203*b*2-*b*2, or 203*b*2-*c*3. The response message may indicate to the UE that the gateway accepts the request of the UE, for example, provide an acceptance indication; or, if the gateway fails to provide a detection function, in this case, the gateway may return a rejection response; or, if the gateway fails to provide a query for all the destination servers, the gateway may provide an indication in the response message, which may specifically be returning "information about a server which may be detected by the gateway as a proxy" or "information about a server which cannot be detected by the gateway as a proxy". The information may be provided by a separate information element, and may also be implemented by expanding an existing information element, for example, may be put in a PCO information element.

After receiving the response message in 203*b*2-*a*2, 203*b*2-*b*2, or 203*b*2-*c*4, the S-GW performs step 203*b*3 to send the update bearer request message to the MME, where the message includes the response message provided by the P-GW.

Step 204: After receiving the message in step 203*a*2 or step 203*b*3, the SGSN/MME sends an update bearer response message to the UE.

The update bearer response message may indicate to the UE the response information provided by the gateway.

After receiving the response message, the UE stops DNS or connection establishment detection processing implemented in step 202*a*/202*b*. If the UE still receives a request of detection on the service server sent by service software (such as QQ) that runs in the user equipment, the UE may directly discard the request without performing step 202*a*/202*b*.

The update bearer response message may specifically include several cases as follows.

(1) In the GPRS network, the SGSN sends a Modify PDP Context Accept message to the UE.

(2) In the EPS network, the MME sends an Update Bearer Request message to the UE; in this case, after receiving the Update Bearer Request message, the UE sends an Update Bearer Response message to the MME, and then to the S-GW and the P-GW.

Step 205*a*: The GGSN/P-GW as a proxy for the UE initiates a DNS detection process according to the address information of the DNS server provided by the UE in step 203.

Step 205*b*: The GGSN/P-GW as a proxy for the UE initiates a connection establishment detection process according to the address information of the destination service server provided by the UE in step 203.

There may be no sequence relationship between step 204 and step 205*a*/205*b*.

Step 206: The gateway detects that the fault in one or more related destination servers is rectified.

For example, a DNS query response is received, or a TCP connection or an HTTP connection to a certain destination server is successfully established.

When detecting that the fault in the destination server is rectified or the path is reachable, the gateway may perform the following steps repeatedly.

The gateway sends a bearer update request message to the UE, and notifies the UE of the information about the DNS server or the service server to which the path is reachable.

The gateway may send the bearer update request message to all UEs with an established data channel. To reduce the number of update bearer request messages, the gateway may also send the bearer update request message only to the UE (such as the UE recording related information in step 204) which requests the gateway to perform fault detection as a proxy. A specific method is that, for example, the gateway compares recorded information according to the information (a domain name, an IP address, or the like) of the DNS server or the service server in which the fault is detected to be rectified or to which the path is reachable, and sends the bearer update request message to the UE that has subscribed to the fault detection information.

The bearer update request message may further carry the address information, such as an IP address and/or a port number, or a domain name, of a DNS server or a service server in which the fault is detected to be rectified or to which a path is reachable other than a server that is detected according to a requirement of the UE. The information may be provided by a separate information element, or may also be implemented by expanding an existing information element (such as a PCO). The address information of the server may include information about a primary server and a backup server.

The specific process includes the following processing.

In the GPRS network, the GGSN sends an update PDP context request message to the SGSN.

In the EPS network, one of the following processing procedures is performed according to an interface protocol situation between the S-GW and the P-GW.

(1) If the GTP protocol is used between the S-GW and the P-GW, the P-GW performs step 207*b*1-*a*1, that is, the P-GW sends an update bearer request message to the S-GW.

(2) If the PMIP protocol is used between the S-GW and the P-GW, the P-GW performs step 207*b*1-*b*1 to send a PCC update request message to the PCRF, the PCRF performs step 207*b*1-*b*2 to send the PCC update request message to the S-GW, the S-GW performs step 207*b*1-*b*3 to send a PCC update acknowledgement message to the PCRF, and the PCRF performs step 207*b*1-*b*4 to send the PCC update request message to the P-GW.

After receiving the request message in step 207*b*1-*a*1 or step 207*b*1-*b*2, the S-GW performs step 207*b*2 to send the update bearer request message to the MME.

After receiving the request message in step 207*a*1 or step 207*b*2, the SGSN/MME sends the bearer update request message to the UE. The bearer update request message may specifically include several cases as follows.

(1) In the GPRS network, the SGSN sends a Modify PDP Context Request message to the UE.

(2) In the EPS network, the MME sends the update bearer request message to the UE.

The UE recovers a related service according to the information, received in step 207*c*, of the DNS server or the service server in which the fault is detected to be rectified or to which the path is reachable, and performs step 207*d* to send a bearer update response message to the SGSN/MME. A specific process is that, in the GPRS network, the UE sends a modify PDP context response message to the SGSN; in the EPS network, the UE sends the update bearer response message to the MME.

After receiving the message in step 207d, the SGSN/MME notifies the GGSN/P-GW, where the specific processing is as follows.

(1) In a GPRS network, if the SGSN is a Gn/Gp SGSN, the SGSN performs step 207a2 to send the Update PDP Context Response message to the GGSN.

(2) In the GPRS network, if the SGSN is an S4 SGSN, or in the EPS network, the SGSN/MME performs step 207b3 to send an update bearer response to the S-GW. If the GTP protocol is used between the S-GW and the P-GW, step 207b1-a2 is performed to send an update bearer response message to the P-GW. If the PMIP protocol is used between the S-GW and the P-GW, if step 207b1-b3 is not performed previously, the S-GW performs 207b1-b3 and 207b1-b4.

According to this embodiment, a UE detects a fault in a server, and a gateway device GGSN/P-GW performs fault detection, which avoids frequent air interface release and connections, and frequent bearer deactivation and activation, thereby reducing the signaling overhead of the system, and enhancing stability of a mobile network.

Embodiment 3 of the Present Invention

Figure 3A:
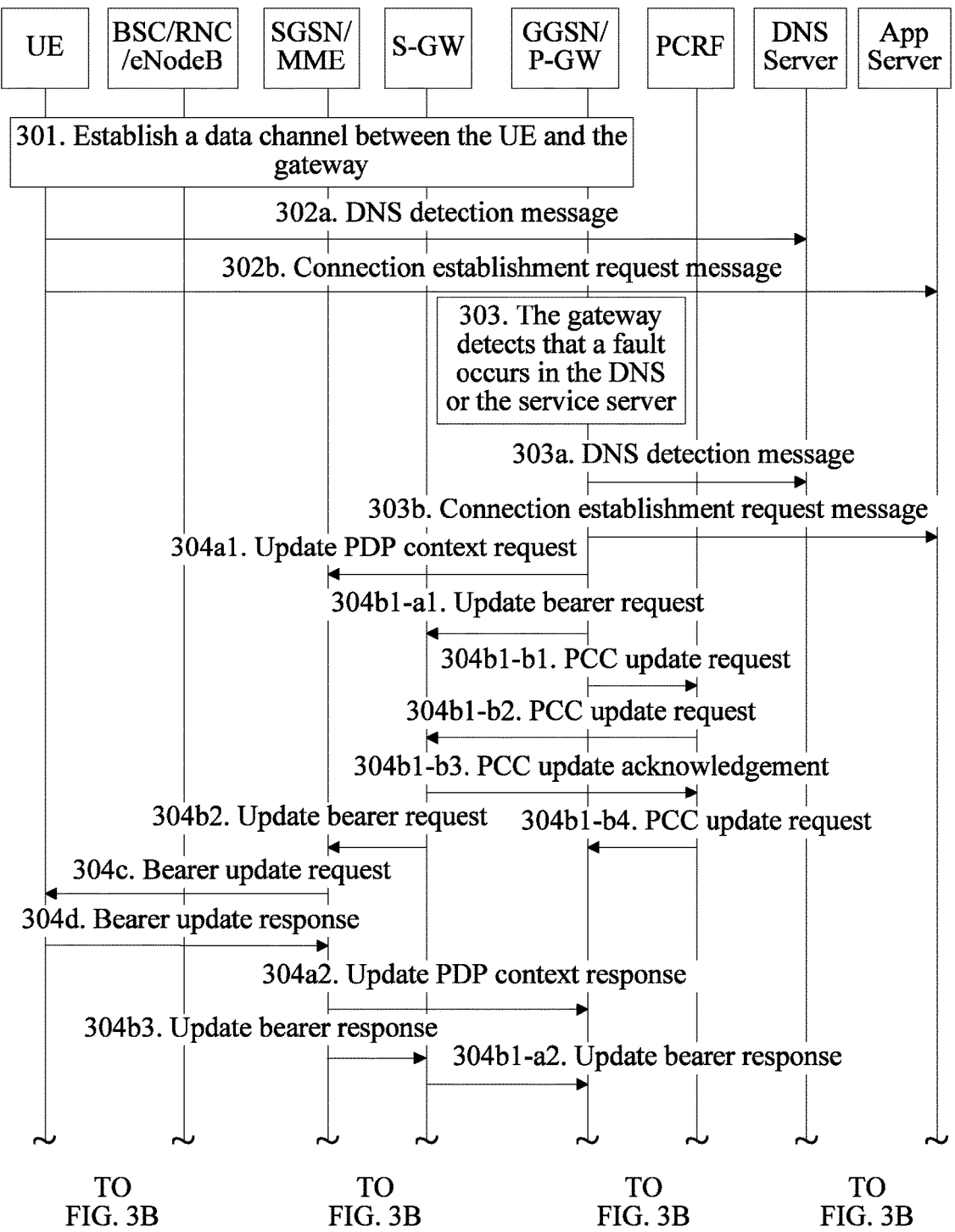
FIG. 3A and FIG. 3B are a flowchart of a method according to Embodiment 3 of the present invention.
Figure 3B:
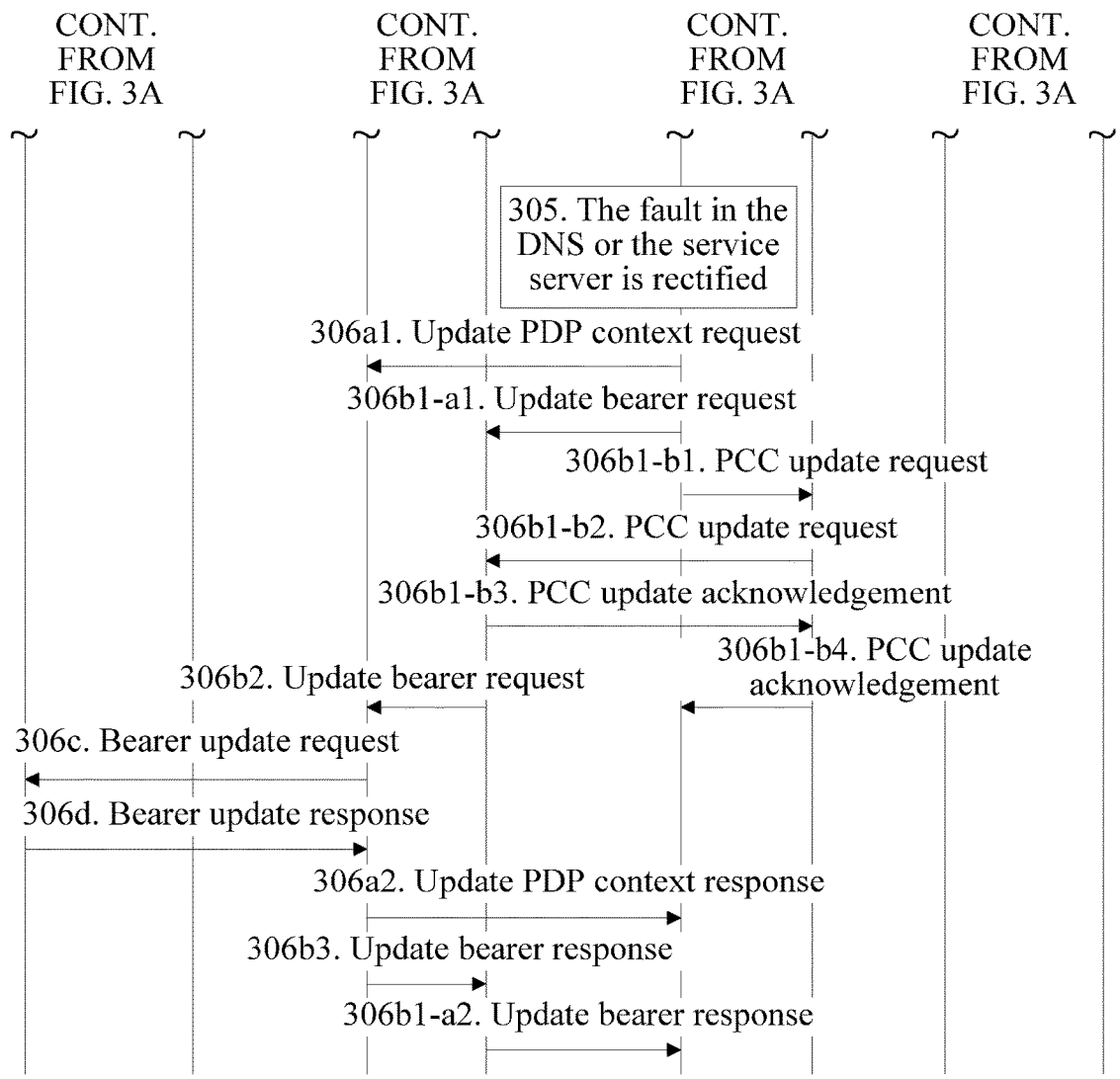
Figure 4:
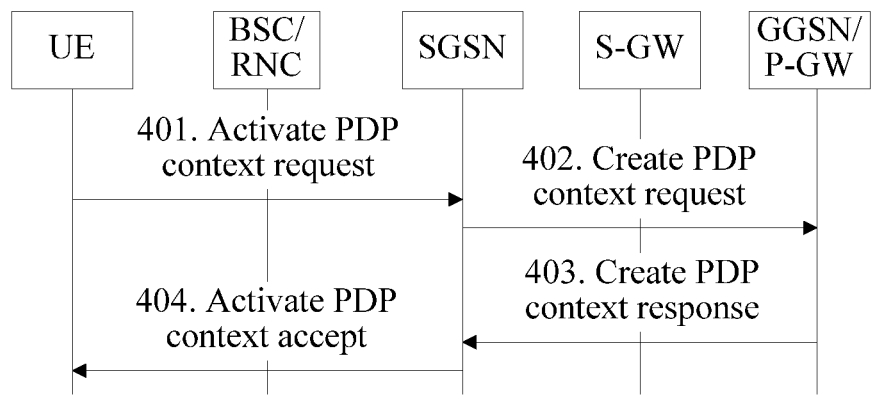
FIG. 4 is a flowchart of a method according to Embodiment 4 of the present invention.
Figure 5:
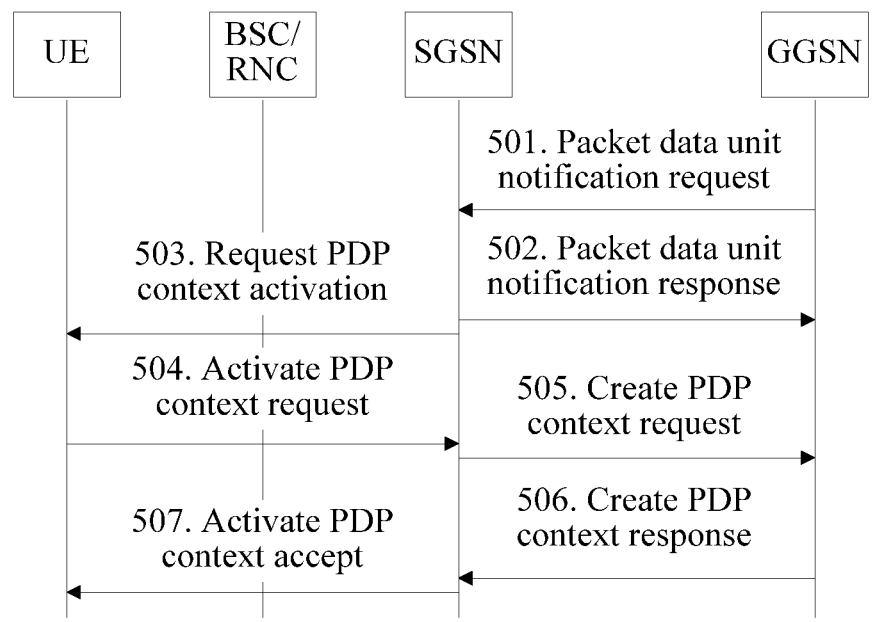
FIG. 5 is a flowchart of a method according to Embodiment 5 of the present invention.
Figure 6:
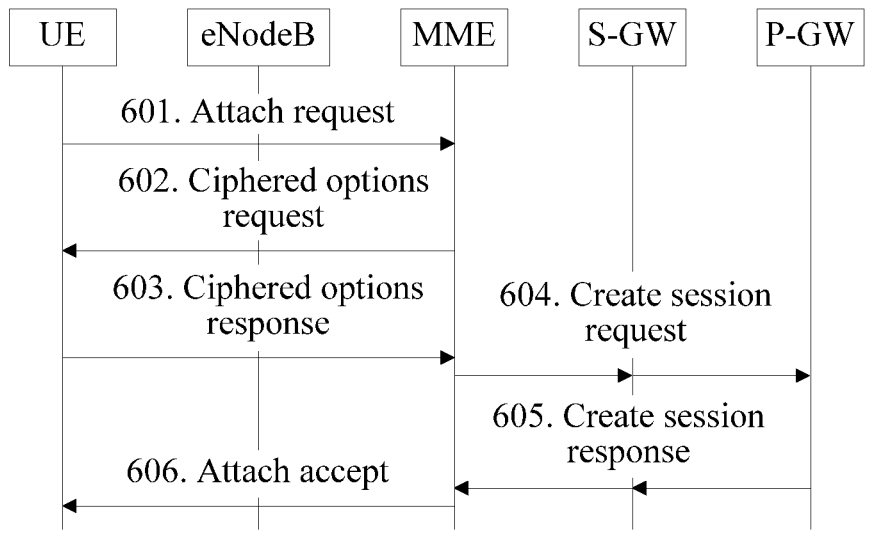
FIG. 6 is a flowchart of a method according to Embodiment 6 of the present invention.
Figure 7:
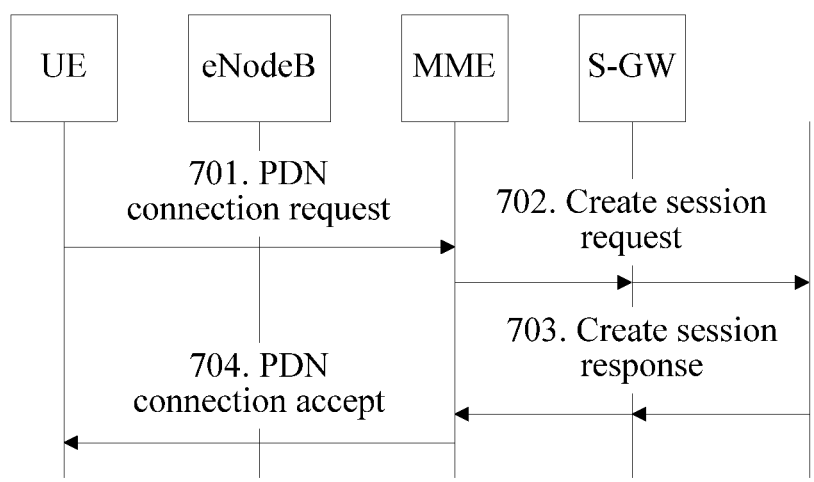
FIG. 7 is a flowchart of a method according to Embodiment 7 of the present invention.
Figure 8:
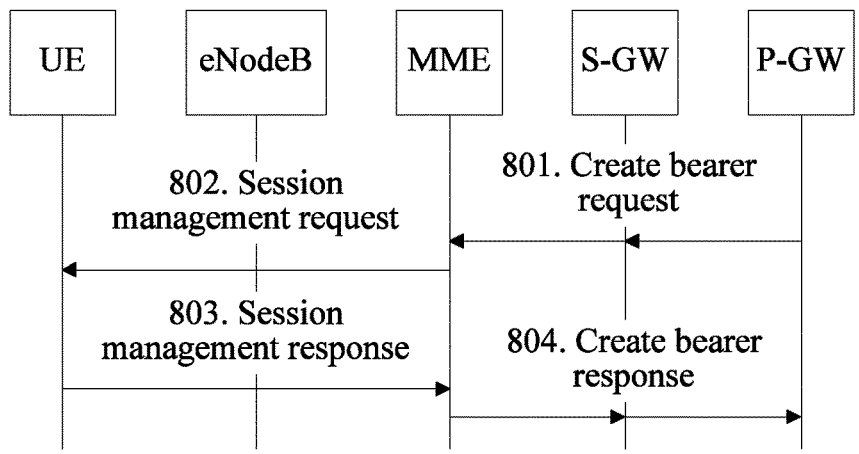
FIG. 8 is a flowchart of a method according to Embodiment 8 of the present invention.
Figure 9:
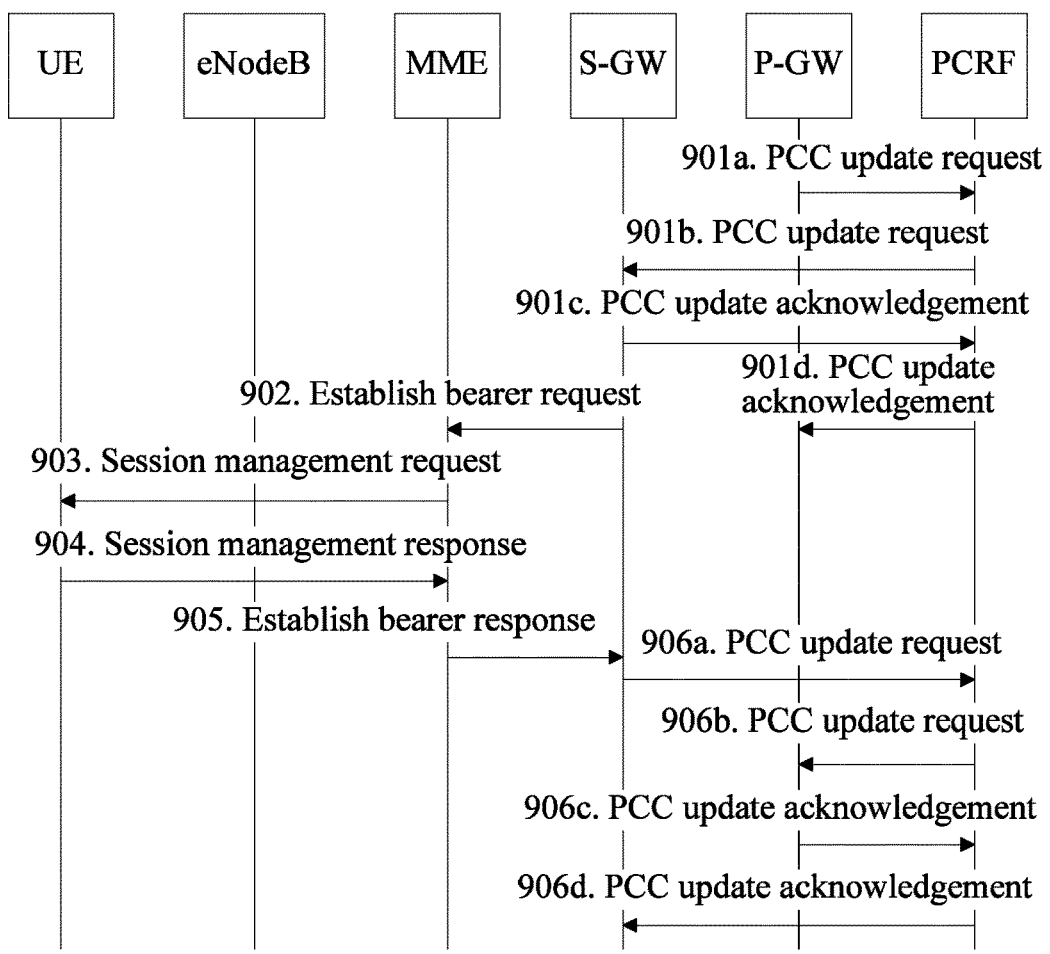
FIG. 9 is a flowchart of a method according to Embodiment 9 of the present invention.

Different from Embodiment 2, in this embodiment, a gateway detects a fault in a server, referring to FIG. 3A and FIG. 3B.

Step 301: A data channel used for data transmission is established between a UE and a gateway GGSN/P-GW.

In a GPRS network, a PDP (Packet Data Protocol) channel between a UE and a GGSN may be established by using a PDP activation process; in an EPS network, a Bearer in a UE and the EPS network may be established by using a bearer establishment process.

Specifically, the fault in the server detected by the gateway may be a fault in a DNS server or a service server, referring to step 302a or 302b.

Step 302a: A fault occurs in a DNS server related to the UE.

An external manifestation is that the UE cannot obtain a DNS query response. The UE may send frequent DNS detection messages to the DNS server, for example, send a DNS query request message.

Step 302b: A fault occurs in a service server (such as a QQ server, a Facebook server, a Tencent Weibo server, a news website, and a mail server) related to the UE.

The fault may be caused by a fault in a destination server (for example, a restart of the server), or may be caused by a fault that occurs in a server in charge of a routing function, or may be caused by a fault that occurs in a path connecting a mobile network and a server, for example, a fault that occurs in a path link or a fault that occurs in a router on a path. An external manifestation is that the UE cannot obtain a TCP connection establishment response, and then the UE may send a connection establishment request message to the destination server (including a primary server and a backup server), such as a TCP handshake message, or an HTTP connection establishment request message.

Step 303: The gateway detects that the fault occurs in the DNS server or the service server.

A specific method may be that, the gateway detects, by using a DPI (Data Packet Inspection) or DFI (Data Flow Inspection) mechanism, that the UE frequently performs DNS queries or TCP connection attempts, but fails to receive any response; or the gateway detects, by using path detection on the gateway, that the fault occurs in the DNS server or the fault occurs in the service server.

In this case, the gateway may initiate path detection on the related DNS server or service server, that is, step 303a and step 303b are performed. Before, when, or after performing fault detection on the DNS server or the service server, the gateway may instruct the UE to stop the DNS queries or the TCP connection attempts.

Step 303a: The GGSN/P-GW initiates a DNS detection process to the faulty DNS server.

Step 303b: The GGSN/P-GW initiates a connection establishment detection process to the faulty destination service server.

The gateway may send a bearer update request message to the UE, and notify a UE of information about a DNS server or a service server on which the gateway performs fault detection as a proxy.

The gateway may send the bearer update request message to all UEs with an established data channel; or, to reduce the number of update bearer request messages, the gateway may send the bearer update request message only to the UE on which fault detection is being performed.

The bearer update request message may further include address information, such as an IP address and/or a port number, or a domain name of the server, of the DNS server or the service server on which the gateway performs fault detection as a proxy. The address information of the server may be provided by using a separate information element, or be implemented by expanding an existing information element. For example, the address information may be put in a packet configuration option (PCO) information element. The address information of the server may include information about a primary server and a backup server.

A specific process may include the following.

In the GPRS network, the GGSN performs step 304a1 to send an update PDP context request message to an SGSN.

In the EPS network, one of the following processing procedures is performed according to an interface protocol situation between the S-GW and the P-GW.

(1) When the GTP protocol is used between the S-GW and the P-GW, the P-GW performs step 304b1-a1, that is, the P-GW sends an update bearer request message to the S-GW.

(2) When the PMIP protocol is used between the S-GW and the P-GW, the P-GW performs step 304b1-b1 to send a PCC update request message to the PCRF, the PCRF performs step 304b1-b2 to send the PCC update request message to the S-GW, the S-GW performs step 304b1-b3 to send a PCC update acknowledgement message to the PCRF, and the PCRF performs step 304b1-b4 to send the PCC update request message to the P-GW.

After receiving the request message in step 304b1-a1 or step 304b1-b2, the S-GW performs step 304b2 to send the update bearer request message to an MME.

After receiving the request message in step 304a1 or step 304b2, the SGSN/MME performs step 304c to send the bearer update request message to the UE. The bearer update request message may specifically include several cases as follows.

(1) In the GPRS network, the SGSN sends a modify PDP context request message to the UE.

(2) In the EPS network, the MME sends the update bearer request message to the UE.

According to the information, received in step 304c, about the DNS server or the service server on which the gateway performs fault detection as a proxy, if the UE is performing fault detection (for example, performing path detection) on a same destination address, the UE stops the detection process (step 302a and step 302b), and performs step 304d to send a bearer update response message to the gateway.

If the DNS server or the service server on which the UE is performing fault detection is not included in the information, included in the bearer update request message, about the DNS server or the service server on which the gateway performs fault detection, the UE includes, in the bearer update response message sent to the gateway, information about the DNS server or the service server that is not provided by the gateway, such as, an IP address and/or a port number, or a domain name. In this case, when receiving the information, the gateway initiates, as a proxy for the UE, fault detection on a new DNS server or service server.

A specific process is that, in the GPRS network, the UE sends a Modify PDP Context Accept message to the SGSN; in the EPS network, the UE sends the Update Bearer Response message to the MME.

After receiving the message in step 304d, the SGSN/MME notifies the GGSN/P-GW, where specific processing is as follows.

(1) In the GPRS network, if the SGSN is a Gn/Gp SGSN, the SGSN performs step 304a2 to send the update PDP context response message to the GGSN.

(2) In the GPRS network, if the SGSN is an S4 SGSN, or in the EPS network, the SGSN/MME performs step 304b3 to send an update bearer response to the S-GW; when the GTP protocol is used between the S-GW and the P-GW, step 304b1-a2 is performed to send the update bearer response message to the P-GW; and when the PMIP protocol is used between the S-GW and the P-GW, if step 304b1-b3 is not performed previously, the S-GW performs 304b1-b3, and 304b1-b4.

It should be noted that, whenever it is detected that a fault occurs in the DNS server or the service server, the gateway may perform the foregoing steps again to notify the UE. The GGSN/P-GW detects that the fault in the DNS server or the service server is rectified (step 305), 306a1, 306b1-a1, 306b1-b1, 306b1-b2, 306b1-b3, 306b1-b4, 306b2, 306c, 306d, 306a2, 306b3, and 306b1-a2 are the same as 207a1, 207b1-a1, 207b1-b1, 207b1-b2, 207b1-b3, 207b1-b4, 207b2, 207c, 207d, 207a2, 207b3, and 207b1-a2, respectively, which are not described herein again.

According to this embodiment, a gateway device discovers a fault in a server, and the gateway device as a proxy for a UE performs fault detection on a destination server, which avoids frequent release and connections of an air interface, and frequent bearer deactivation and activation, thereby reducing the signaling overhead of the system, and enhancing stability of a mobile network.

The following several embodiments specifically introduce that a UE and a gateway exchange a capability indication that the gateway performs fault detection. An indication that "a gateway performs fault detection as a proxy for a UE" in the following embodiments may be provided by using a separate information element, and may also be implemented by expanding an existing information element. For example, the indication may be put in a PCO information element, which is not described herein again. The UE provides the gateway, in the data channel establishment process, or a default bearer establishment process, or a PDN connection establishment process, or a dedicated bearer establishment process, with a capability indication that the UE supports that the gateway performs, as a proxy for the UE, fault detection on the server; and/or, the gateway provides the UE, in the data channel establishment process, or the default bearer establishment process, or the PDN connection establishment process, or the dedicated bearer establishment process, with a capability indication that the gateway supports that the gateway performs, as a proxy for the UE, fault detection on the server.

Embodiment 4 of the Present Invention

This embodiment introduces a specific solution that a UE and a gateway exchange a fault detection capability in a data channel establishment scenario initiated by the UE in a GPRS network.

Step 401: A UE sends an activate PDP context request message to an SGSN. If the UE supports a function that a gateway performs, as a proxy, fault detection on a DNS server or a service server, the UE includes in the request message an indication that "a gateway performs fault detection as a proxy for a UE". The activate PDP context request message may specifically include several cases as follows.

(1) an Activate PDP Context Request message, or (2) an Activate Secondary PDP Context Request message.

Step 402: The SGSN sends a create PDP context request message to a GGSN/P-GW. If the UE provides in step 401 the indication that "a gateway performs fault detection as a proxy for a UE", the SGSN includes the indication in the request message sent to the GGSN/P-GW. The create PDP context request message may specifically include several cases as follows.

(1) If the SGSN is a Gn/Gp SGSN, the SGSN sends the create PDP context request message to the GGSN.

(2) If the SGSN is an S4 SGSN, the SGSN sends a create session request message to an S-GW. When the GTP protocol is used between the S-GW and the P-GW, the S-GW sends the create session request message to the P-GW; when the PMIP protocol is used between the S-GW and the P-GWl, the S-GW sends a Proxy Binding Update message to the P-GW.

Step 403: The GGSN/P-GW creates a corresponding PDP context, records the indication that "a gateway performs fault detection as a proxy for a UE" of the UE, and sends a create PDP context response message to the SGSN. If the GGSN/P-GW supports a function that a gateway performs, as a proxy, fault detection on a DNS server or a service server, the GGSN/P-GW includes in the response message the indication that "a gateway performs fault detection as a proxy for a UE".

The create PDP context response message may specifically include several cases as follows.

(1) If the SGSN is a Gn/Gp SGSN, the GGSN sends a create PDP context response message to the SGSN.

(2) If the SGSN is an S4 SGSN, when the GTP protocol is used between the S-GW and the P-GW, the P-GW sends a create session response message to the S-GW; when the PMIP protocol is used between the S-GW and the P-GW, the message sent by the P-GW to the S-GW is specifically a Proxy Binding Ack message. The S-GW sends the create session response message to the SGSN.

Step 404: The SGSN sends an activate PDP context accept message to the UE. If the GGSN/P-GW provides in step 403 the indication that "a gateway performs fault detection as a proxy for a UE", the SGSN includes the indication in the accept message sent to the UE. Correspondingly, the activate PDP context accept message may specifically include several cases as follows.

(1) an Activate PDP Context Accept message, or (2) an Activate Secondary PDP Context Accept message.

According to the embodiment of the present invention, a UE and a gateway exchange, in a data channel establishment process initiated by the UE, an indication that a gateway performs fault detection as a proxy for a UE, so that the gateway performs fault detection as a proxy for the UE when a fault occurs in a DNS server or a service server subsequently.

Embodiment 5 of the Present Invention

This embodiment introduces a specific solution that a UE and a gateway exchange a fault detection capability in a data channel establishment scenario initiated on a network side in a GPRS network.

Step 501: A GGSN sends a PDU (packet data unit) notification request message to an SGSN. If the GGSN supports a function that a gateway, as a proxy, performs fault detection on a DNS server or a service server, the GGSN includes in the request message an indication that "a gateway performs fault detection as a proxy for a UE".

Step 502: The SGSN sends a packet data unit notification response message to the GGSN.

Step 503: The SGSN sends a Request PDP Context Activation message to the UE. If the GGSN provides in step 501 the indication that "a gateway performs fault detection as a proxy for a UE", the SGSN includes the indication in the request message sent to the UE.

Step 504 to step 507 are the same as step 401 to step 404 in Embodiment 4 for the processing of the UE initiating PDP activation (excluding processing of PDP secondary activation), which is not described herein again.

It should be further noted that, specific message processing in step 4 to step 7 in this embodiment does not include a scenario in which the SGSN is an S4 SGSN, and only includes processing in which the SGSN is a Gn/Gp SGSN.

According to the embodiment of the present invention, a UE and a gateway exchange, in a data channel establishment process initiated on a network side, an indications that a gateway performs fault detection as a proxy for a UE, so that the gateway performs fault detection as a proxy for the UE when a fault occurs in a DNS server or a service server subsequently.

Embodiment 6 of the Present Invention

This embodiment introduces a specific solution that a UE and a gateway exchange a fault detection capability in a scenario in which the UE initiates an Attach process to establish a default bearer in an EPS network.

Step 601: A UE sends an attach request message to an MME. If the UE supports a function that a gateway, as a proxy, performs fault detection on a DNS server or a service server, the UE includes in the request message an indication that "a gateway performs fault detection as a proxy for a UE". The indication may also not be provided in step 601 but instead be provided in step 603.

Step 602: The MME sends a Ciphered Options Request message to the UE.

Step 603: The UE sends a Ciphered Options Response message to the MME. If the UE supports the function that a gateway, as a proxy, performs fault detection on a DNS server or a service server, and the UE does not provide for the MME in step 601, the UE includes in the response message the indication that "a gateway performs fault detection as a proxy for a UE". The UE performs other processing of the Attach process, for example, completes interaction with an HLR/HSS and creates a context of the UE, and performs the following steps.

Step 604: The MME sends a create session request message to an S-GW.

When the GTP protocol is used between the S-GW and a P-GW, the S-GW sends the create session request message to the P-GW; when the PMIP protocol is used between the S-GW and the P-GW, the S-GW sends a proxy binding update message to the P-GW.

If the UE provides in step 601 or step 603 the indication that "a gateway performs fault detection as a proxy for a UE", the MME includes the indication in the request message sent to the S-GW/P-GW.

Step 605: The P-GW creates a corresponding session context, records the indication that "a gateway performs fault detection as a proxy for a UE" of the UE, and sends a create session response message to the S-GW.

Correspondingly, when the GTP protocol is used between the S-GW and the P-GW, the message sent by the P-GW to the S-GW is specifically the create session response message; when the PMIP protocol is used between the S-GW and the P-GW, the message sent by the P-GW to the S-GW is specifically a proxy binding acknowledgement message.

The S-GW sends the Create Session Response message to the MME.

If the P-GW supports the function that a gateway, as a proxy, performs fault detection on a DNS server or a service server, the P-GW includes in the response message the indication that "a gateway performs fault detection as a proxy for a UE".

Step 606: The MME sends an attach accept message to the UE. If the P-GW provides in step 5 the indication that "a gateway performs fault detection as a proxy for a UE", the MME includes the indication in the accept message sent to the UE.

According to the embodiment of the present invention, in a process that a UE initiates an Attach process to establish a default bearer, the UE and a gateway exchange an indication that a gateway performs fault detection as a proxy for a UE, so that the gateway performs fault detection as a proxy for the UE when a fault occurs in a DNS server or a service server subsequently.

Embodiment 7 of the Present Invention

This embodiment introduces a specific solution that a UE and a gateway exchange a fault detection capability in a scenario in which the UE requests for a PDN connection in an EPS network.

Step 701: A UE sends a PDN connection establishment request message to an MME.

If the UE supports a function that a gateway, as a proxy, performs fault detection on a DNS server or a service server, the UE includes in the request message an indication that "a gateway performs fault detection as a proxy for a UE".

Step 702: The MME sends a create session request message to an S-GW.

When the GTP protocol is used between the S-GW and a P-GW, the S-GW sends a create session request message to the P-GW; and when the PMIP protocol is used between the S-GW and the P-GW, the S-GW sends a proxy binding update message to the P-GW.

If the UE provides in step 701 the indication that "a gateway performs fault detection as a proxy for a UE", the MME includes the indication in the request message sent to the S-GW/P-GW.

Step 703: The P-GW creates a corresponding session context, records the indication that "a gateway performs fault detection as a proxy for a UE" of the UE, and sends a create session response message to the S-GW.

Correspondingly, when the GTP protocol is used between the S-GW and the P-GW, the message sent by the P-GW to the S-GW is specifically the create session response message; when the PMIP protocol is used between the S-GW and the P-GW, the message sent by the P-GW to the S-GW is specifically a proxy binding acknowledgement message.

The S-GW sends the create session response message to the MME.

If the P-GW supports the function that a gateway, as a proxy, performs fault detection on a DNS server or a service server, the P-GW includes in the response message the indication that "a gateway performs fault detection as a proxy for a UE".

Step 704: The MME sends a PDN Connectivity Accept message to the UE. If the P-GW provides in step 703 the indication that "a gateway performs fault detection as a proxy for a UE", the MME includes the indication in the accept message sent to the UE.

According to the embodiment of the present invention, in a process that a UE requests for a PDN connection, the UE and a gateway exchange an indication that a gateway performs fault detection as a proxy for a UE, so that the gateway performs fault detection as a proxy for the UE when a fault occurs in a DNS server or a service server subsequently.

Embodiment 8 of the Present Invention

This embodiment introduces a specific solution that a UE and a gateway exchange a fault detection capability in a dedicated bearer establishment process scenario based on the GTP protocol in an EPS network.

Step 801: A P-GW sends a create bearer request message to an S-GW, and then to an MME, and if the P-GW supports a function that a gateway, as a proxy, performs fault detection on a DNS server or a service server, the P-GW includes in the request message an indication that "a gateway performs fault detection as a proxy for a UE".

Step 802: The MME sends a session management request message to the UE. If the P-GW provides in step 801 the indication that "a gateway performs fault detection as a proxy for a UE", the MME includes the indication in the request message sent to the UE.

Step 803: The UE records the indication that "a gateway performs fault detection as a proxy for a UE" of the P-GW, and sends a session management response message to the MME. If the UE supports the function that a gateway, as a proxy, performs fault detection on a DNS server or a service server, the UE includes in the response message the indication that "a gateway performs fault detection as a proxy for a UE".

Step 804: The MME sends a create bearer response message to the S-GW, and then to the P-GW. If the UE provides in step 803 the indication that "a gateway performs fault detection as a proxy for a UE", the MME includes the indication in the response message sent to the P-GW.

According to the embodiment of the present invention, in a dedicated bearer establishment process based on the GTP protocol, a UE and a gateway exchange an indication that a gateway performs fault detection as a proxy for a UE, so that the gateway performs fault detection as a proxy for the UE when a fault occurs in a DNS server or a service server subsequently.

Embodiment 9 of the Present Invention

This embodiment introduces a specific solution that a UE and a gateway exchange a fault detection capability in a dedicated bearer establishment process scenario based on the PMIP protocol in an EPS network.

A P-GW performs step 901*a* to send a PCC update request to a PCRF, the PCRF performs step 901*b* to send the PCC update request to an S-GW, the S-GW performs step 901*c* to send a PCC update acknowledgement message to the PCRF, and the PCRF performs step 901*d* to send PCC update acknowledgement to the P-GW.

If the P-GW supports a function that a gateway, as a proxy, performs fault detection on a DNS server or a service server, the P-GW includes in the messages in step 901*a* and step 901*b* the indication that "a gateway performs fault detection as a proxy for a UE" and sends the indication to the S-GW.

Step 902: The S-GW sends a create bearer request message to an MME. If the P-GW provides in step 1 the indication that "a gateway performs fault detection as a proxy for a UE", the S-GW includes the indication in the request message sent to the MME.

Step 903: The MME sends a session management request message to a UE. If the P-GW provides in step 901*a* or 901*b* the indication that "a gateway performs fault detection as a proxy for a UE", the MME includes the indication in the request message sent to the UE.

Step 904: The UE records the indication that "a gateway performs fault detection as a proxy for a UE" of the P-GW, and sends a session management response message to the MME. If the UE supports the function that a gateway, as a proxy, performs fault detection on a DNS server or a service server, the UE includes in the response message the indication that "a gateway performs fault detection as a proxy for a UE".

Step 905: The MME sends a Create Bearer Response message to the S-GW. If the UE provides in step 904 the indication that "a gateway performs fault detection as a proxy for a UE", the MME includes the indication in the response message sent to the P-GW.

The S-GW performs step 906*a* to send a PCC update request message to a PCRF, the PCRF performs step 906*b* to send the PCC update request message to the P-GW, the P-GW performs step 906*c* to send PCC update acknowledgement to the PCRF, and the PCRF performs step 906*d* to send the PCC update acknowledgement to the S-GW. If the S-GW provides in step 905 the indication that "a gateway performs fault detection as a proxy for a UE", the S-GW includes the indication in the messages in step 906*a* and step 906*b*.

According to the embodiment of the present invention, in a dedicated bearer establishment process based on the PMIP protocol, a UE and a gateway exchange an indication that a gateway performs fault detection as a proxy for a UE, so that the gateway performs fault detection as a proxy for the UE when a fault occurs in a DNS server or a service server subsequently.

Embodiment 10 of the Present Invention

Figure 10:
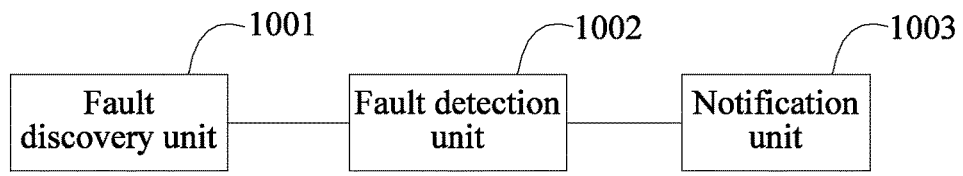
FIG. 10 is a structural block diagram of a gateway according to Embodiment 10 of the present invention.

This embodiment provides a gateway device. Referring to FIG. 10, the gateway device includes a fault discovery unit 1001, configured to discover that a fault occurs in a DNS server or a service server related to a UE; a fault detection unit 1002, configured to perform fault detection on the DNS server or the service server; and a notification unit 1003, configured to: after it is detected that the fault is rectified, instruct the UE to establish a connection to the DNS server or the service server.

Herein, the fault discovery unit 1001 detects, by using a data packet inspection DPI or data process inspection DFI mechanism, that the UE performs a DNS query or a TCP connection attempt and the UE fails to receive a response. Alternatively, a request of the UE to perform fault detection is received.

That the fault detection unit 1002 performs fault detection on the DNS server or the service server may be specifically that the fault detection unit 1002 sends a DNS detection message to the DNS server, or sends a connection establishment request message to the service server.

The gateway in the embodiment of the present invention may be a GGSN or a P-GW.

The gateway device in the embodiment of the present invention performs fault detection as a proxy for a UE, which avoids frequent air interface release and connections, and frequent bearer deactivation and activation, thereby reducing the signaling overhead of the system, and enhancing stability of a mobile network.

Embodiment 11 of the Present Invention

Figure 11:
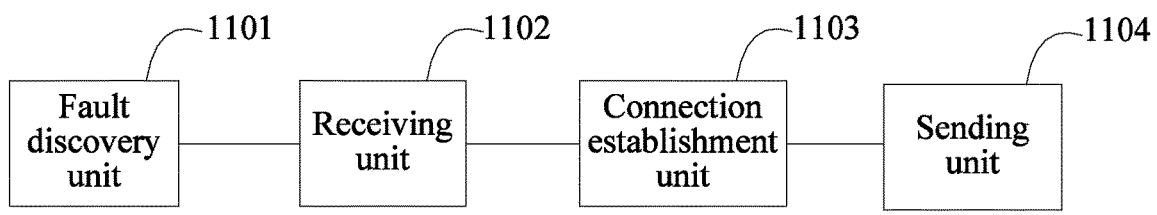
FIG. 11 is a structural block diagram of a UE according to Embodiment 11 of the present invention.

This embodiment provides a UE. Referring to FIG. 11, the UE includes a fault discovery unit 1101, configured to discover that a fault occurs in a DNS server or a service server; a receiving unit 1102, configured to receive a notification that a gateway performs fault detection on the DNS server or the service server; and after the fault is rectified, receive a notification, sent by the gateway, of establishing a connection to the DNS server or the service server; and a connection establishment unit 1103, configured to establish the connection to the DNS server or the service server.

Herein, the UE may further include a sending unit 1104, configured to send, to the gateway by using a bearer update process, address information of a server on which the gateway is required to perform fault detection. The bearer update process herein may be that the UE sends a modify PDP context request message to an SGSN, and the SGSN sends an update PDP context request message to a GGSN; or may also be that the UE sends a request bearer resource modification message to an MME, the MME sends a bearer resource command message to an S-GW, the S-GW sends the bearer resource command message or a proxy binding update message to a P-GW, or the S-GW sends a PCC update request message to a PCRF, and the PCRF sends the PCC update request message to the P-GW.

According to the UE provided in the embodiment of the present invention, the UE discovers that a fault occurs in a DNS server or a service server, and a gateway performs fault detection, which avoids frequent air interface release and connections, and frequent bearer deactivation and activation, thereby reducing the signaling overhead of the system, and enhancing stability of a mobile network.

Embodiment 12 of the Present Invention

Figure 12:
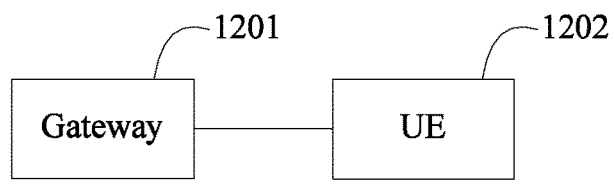
FIG. 12 is a structural block diagram of a communications system according to Embodiment 12 of the present invention.

This embodiment provides a communications system. Referring to FIG. 12, the communications system includes a gateway 1201, configured to discover that a fault occurs in a DNS server or a service server related to a UE, perform fault detection on the DNS server or the service server, and after it is detected that the fault is rectified, instruct the UE to establish a connection to the DNS server or the service server; and a UE 1202, configured to receive a notification that the gateway 1201 performs fault detection on the DNS server or the service server; after the fault is rectified, receive a notification, sent by the gateway 1201, of establishing the connection to the DNS server or the service server, and establish the connection to the DNS server or the service server.

The gateway 1201 herein may be a GGSN or a P-GW.

According to the communications system in the embodiment of the present invention, a gateway performs fault detection as a proxy for a UE, which avoids frequent release and connections of an air interface, and frequent bearer deactivation and activation, thereby reducing the signaling overhead of the system, and enhancing stability of a mobile network.

In the several embodiments provided in the present application, it should be understood that the disclosed system, device, and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electrical, mechanical, or other forms.

The units described as separate parts may or may not be physically separate, and parts displayed as units may or may not be physical units, may be located at one position, or may be distributed on a plurality of network units. A part or all of the units may be selected according to actual needs to achieve the objectives of the solutions of these embodiments.

In addition, functional units in the embodiments of the present invention may be integrated into one processing unit, or each of the units may exist alone physically, or two or more units are integrated into one unit. The foregoing integrated unit may be accomplished through hardware, or through hardware plus software functional unit.

When the foregoing integrated unit is implemented in a form of a software functional unit, the integrated unit may be stored in a computer-readable storage medium. The foregoing software functional unit is stored in one storage medium and includes several instructions for instructing a computer device (which may be a personal computer, a server, or a network device) to perform a part of steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method, comprising:
    discovering, by a gateway, that a fault occurs in a domain name system (DNS) server or a service server related to a user equipment (UE);

detecting, by the gateway, whether the fault is rectified;
instructing, by the gateway, the UE to stop a DNS query or a Transmission Control Protocol (TCP) connection attempt; and
after the fault is rectified, transmitting, by the gateway, a notification message to the UE, wherein the notification message is used for establishment of a connection to the DNS server or the service server.

2. The method according to claim 1, wherein discovering that the fault occurs in the DNS server or the service server related to the UE comprises:
discovering that the fault occurs in the DNS server or the service server related to the UE in response to detecting, by the gateway by using a data packet inspection (DPI) or data flow inspection (DFI) mechanism, that the UE performs the DNS query or the transmission control protocol (TCP) connection attempt, and detecting that the UE fails to receive a response.

3. The method according to claim 1, wherein detecting whether the fault is rectified comprises:
sending, by the gateway, a DNS detection message to the DNS server, or a connection establishment request message to the service server to detect whether the fault is rectified.

4. The method according to claim 1, wherein the notification message comprises address information of the DNS server or the service server in which the fault is rectified.

5. The method according to claim 1, further comprising:
sending, by the gateway to the UE, in a data channel establishment process, or a default bearer establishment process, or a PDN connection establishment process, or a dedicated bearer establishment process, a capability indication of supporting that the gateway detects whether the fault is rectified as a proxy for the UE.

6. A method, comprising:
discovering, by a user equipment (UE), that a fault occurs in a domain name system (DNS) server or a service server related to the UE;
requesting, by the UE, a gateway to detect whether the fault is rectified for the UE;
receiving, by the UE, a notification message from the gateway after the fault is rectified; and
establishing, by the UE, a connection to the DNS server or the service server in response to the received notification message.

7. The method according to claim 6, wherein discovering that the fault occurs in the DNS server or the service server comprises:
discovering, by the UE, that the UE fails to obtain a response from the DNS server or the service server.

8. The method according to claim 6, wherein requesting the gateway to detect whether the fault is rectified comprises:
sending, by the UE to the gateway, an indication or address information of the DNS server or the service server to request the gateway to detect whether the fault is rectified.

9. The method according to claim 6, wherein requesting the gateway to detect whether the fault is rectified comprises:
providing, by the UE, address information of the DNS server or the service server to the gateway in a bearer update process.

10. The method according to claim 9, wherein requesting the gateway to detect whether the fault is rectified comprises:
sending, by the UE to the gateway, an update bearer request message, wherein the update bearer request message comprises address information of the DNS server or the service server.

11. The method according to claim 6, further comprising:
stopping, by the UE, detecting whether the fault is rectified.

12. The method according to claim 11, wherein before stopping detecting whether the fault is rectified, the method further comprises:
receiving, by the UE, a response to confirm that the gateway detects whether the fault is rectified as a proxy for the UE.

13. The method according to claim 6, wherein before requesting the gateway to detect whether the fault is rectified, the method further comprises:
receiving, by the UE, a capability indication that the gateway supports detecting whether the fault is rectified as a proxy for the UE.

14. A user equipment (UE), comprising:
a processor, configured to discover that a fault occurs in a domain name system (DNS) server or a service server related to the UE;
a transmitter, configured to request a gateway to detect, for the UE, whether the fault is rectified; and
a receiver, configured to receive a notification message from the gateway after the fault is rectified;
wherein the processor is further configured to establish a connection to the DNS server or the service server in response to the received notification message.

15. The UE according to claim 14, wherein the processor is further configured to:
discover that the UE fails to obtain a response from the DNS server or the service server.

16. The UE according to claim 14, wherein the transmitter is further configured to:
send to the gateway an indication or address information of the DNS server or the service server to request the gateway to detect whether the fault is rectified.

17. The UE according to claim 14, wherein the processor is further configured to stop detecting whether the fault is rectified.

18. The UE according to claim 17, wherein the receiver is further configured to receive, before the processor stops detecting whether the fault is rectified, a response to confirm that the gateway detects whether the fault is rectified as a proxy for the UE.

19. The UE according to claim 14, wherein the receiver is further configured to receive, before the transmitter requests the gateway to detect whether the fault is rectified, capability indication that the gateway supports detecting whether the fault is rectified as a proxy for the UE.

* * * * *